H. A. Parkhurst.

Mower.

No. 3538 Reissued Jul. 6, 1869.

Witnesses.
Jos. A. Peyton,
Baltis D. Long,

Inventor.
H. A. Parkhurst
by his Attorney
Wm. H. Baldwin

Sheet 2. 2 Sheets.

H. A. Parkhurst.

Mower.

No. 3538 Reissued Jul. 6, 1869.

Witnesses.

Joe S. Peyton.
Baltis & Long.

Inventor:
C. H. McCormick
by his Attorney
Wm. D. Baldwin

H. A. Parkhurst.

Mower.

No. 3538 Reissued Jul. 6, 1869.

Witnesses.
Jos. A. Peyton.
Ballis DeLong

Inventor.
C. H. McCormick
by his Atty
Wm. D. Baldwin

UNITED STATES PATENT OFFICE.

C. H. McCORMICK, OF CHICAGO, ILLINOIS, ASSIGNEE, BY MESNE ASSIGNMENTS, OF HAMILTON A. PARKHURST.

IMPROVEMENT IN HARVESTERS.

Specification forming part of Letters Patent No. 19,442, dated February 23, 1858; Reissue No. 3,538, dated July 6, 1869.

*To all whom it may concern:*

Be it known that HAMILTON A. PARKHURST, of Fairfield, in the county of Herkimer and State of New York, invented certain new and useful Improvements in Harvesting-Machines, of which the following is a full, clear, and exact description.

The invention herein claimed relates to that class of two-wheeled harvesters in which a laterally-projecting cutting apparatus is suspended, by one end only, from a main frame by means of hinged connections which permit the finger-beam to rise and fall, to conform to the undulations of the surface over which it slides; and the improvements herein claimed consist—

First, in a novel method of combining, with a two-wheeled harvester, a frame carrying a laterally-projecting cutting apparatus, and movable or adjustable about a center coincident with the center of rotation of a bevel-wheel mounted on an axis parallel with, but independent of, the main drive-wheel axle.

Second, in a novel method of combining, in a two-wheeled harvester, a frame carrying a crank-shaft and pinion, and adjustable around a gear-center in front of the axle of the driving-wheels, with a laterally-projecting cutting apparatus hinged in the line of the crank-shaft.

Third, in a novel method of combining, in a two-wheeled harvester, a frame movable about a gear-center independently of the axles of the bearing-wheels, with a laterally-projecting cutting apparatus vibrating about a gear-center at right angles to the main axle.

Fourth, in a novel method of combining, with a two-wheeled harvester, a laterally-projecting cutting apparatus, connected with the main frame at one end only, movable around two gear-centers at right angles to each other, and both independent of the driving-wheel axle.

Fifth, in a novel method of combining an internally-geared driving spur-wheel with a spur-pinion, a counter-shaft parallel with and in front of the main axle, a bevel-wheel on the counter-shaft, driving a line-shaft crossing the axles of the driving-wheels, and carrying a spur-gear driving a spur-pinion on a crank-shaft likewise crossing the main axle, thus triple-gearing the cutters, to give them increased speed relatively to the driving-wheel.

Figure 1:
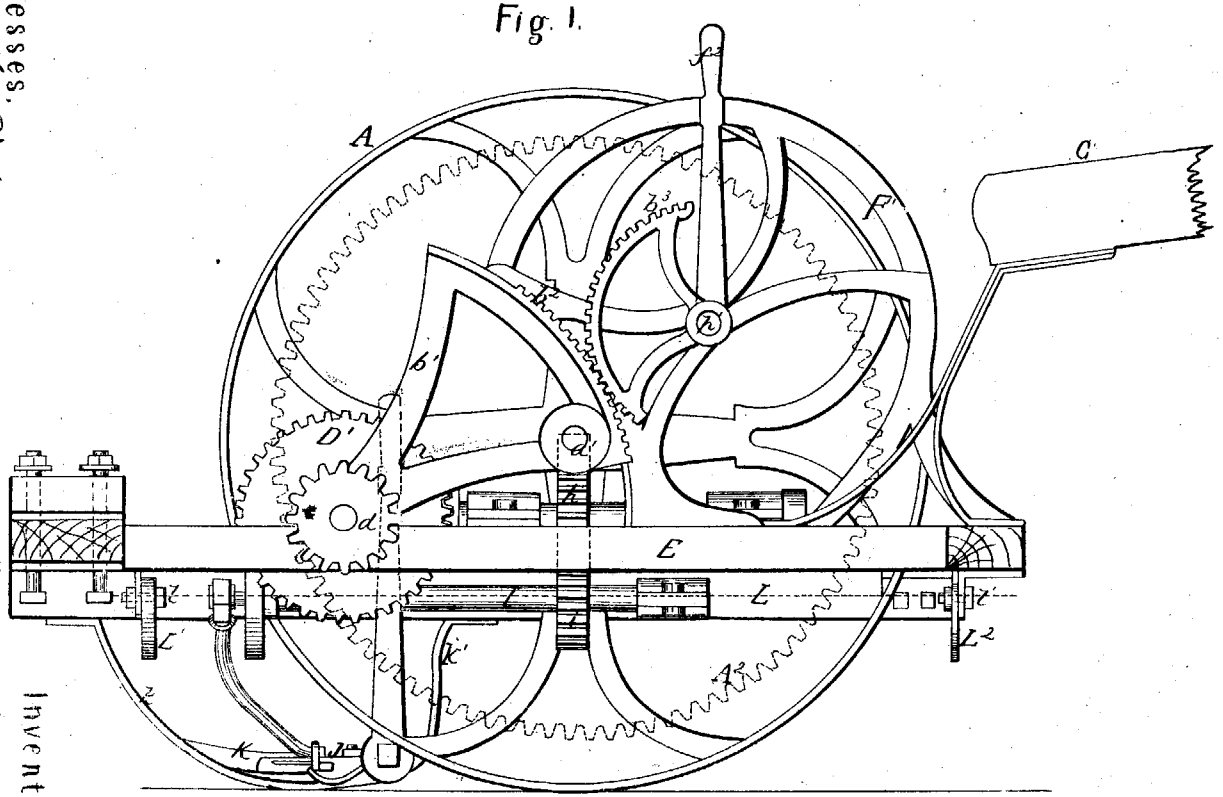
Figure 2:
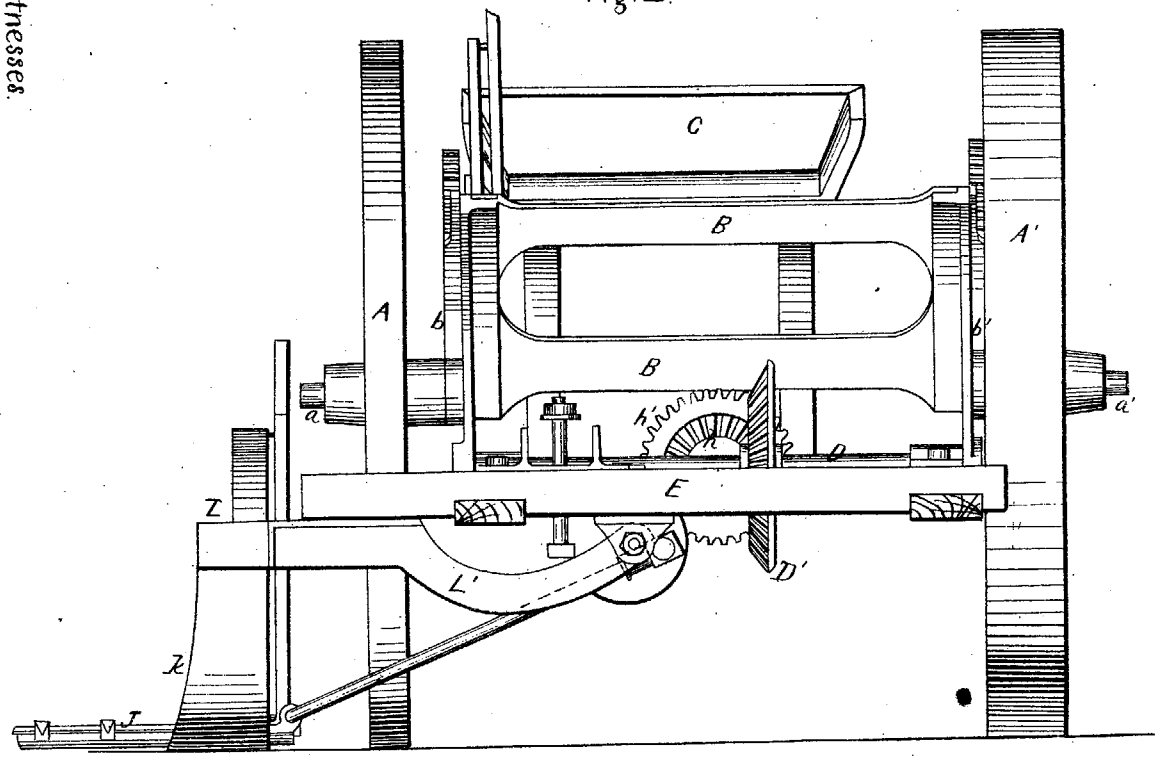
Figure 3:
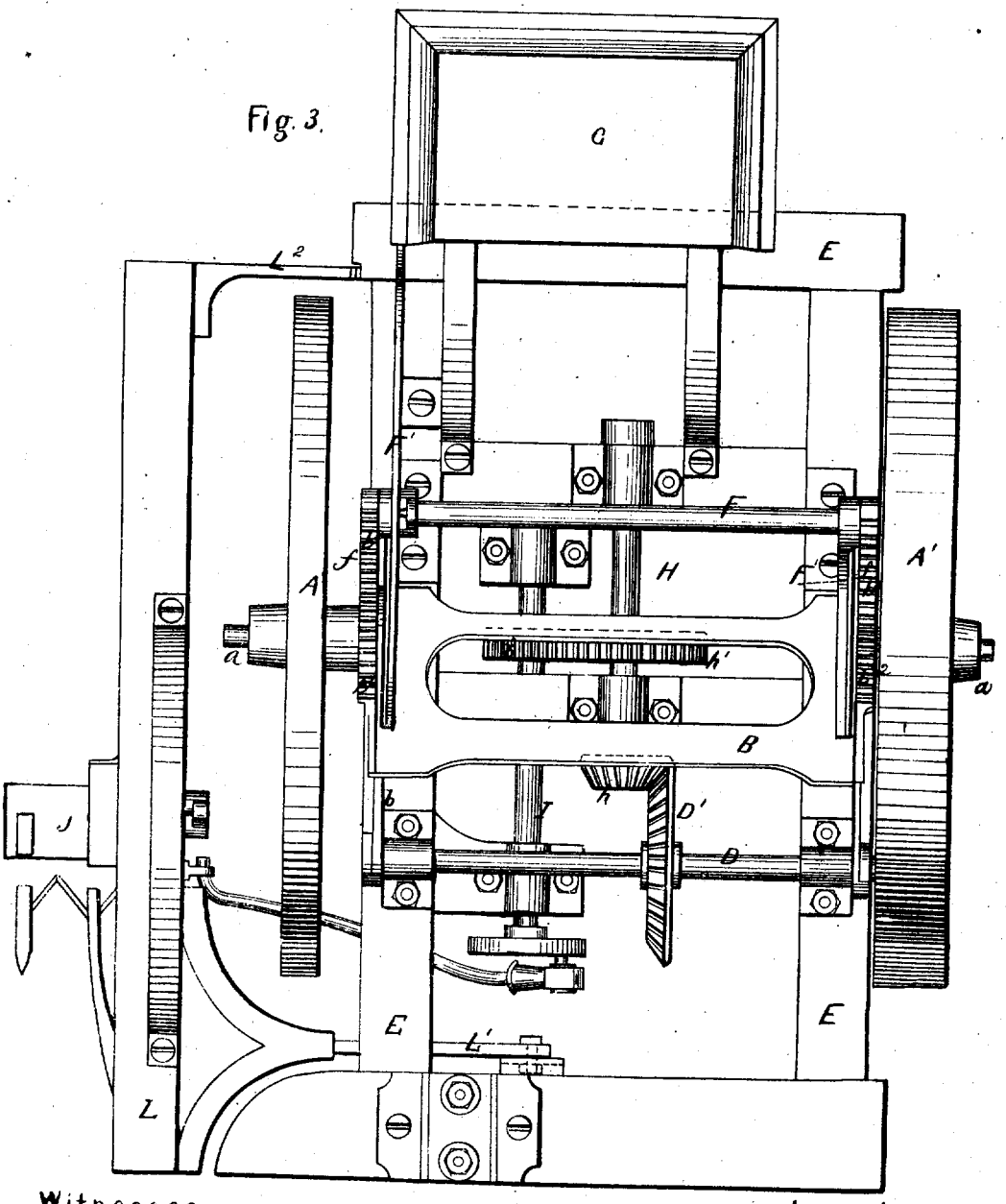

In the accompanying drawings, which show all of said PARKHURST'S improvements as embodied in one machine, Figure 1 represents a view, in elevation, of the improved harvester as seen from the stubble side thereof, with the outer wheel removed. Fig. 2 represents a similar view of the same as seen from the front, with both wheels in place; and Fig. 3 represents a plan or top view of the same.

Two main bearing-wheels, A $A^1$, turn freely on stud-axles $a$ $a'$, mounted on radius-bars or sector-plates $b$ $b^1$, connected by a frame, B, spanning the main frame and oscillating around a shaft, D, turning in suitable bearings on the main frame E. Teeth $b^2$ on the sectors $b$ $b^1$ gear into corresponding teeth $b^3$ on quadrant-racks $f$ $f^1$, fixed upon and turning with a rock-shaft, F, mounted on a frame, $F^1$, and controlled by a hand-lever, $f^2$, operated by the driver from his seat G. The lever is held in any desired position by pins in the frame $F^1$, on the rear of the main frame. The front side of the frame $F^1$ is concave, and fits the curved surface of the frame B, on which it slides, thus always affording a firm support. By this mode of construction, it will be observed, the main frame can be raised or lowered upon the axles $a$.

In order that the raising and lowering of this frame may not impede the working of the gearing, the axis around which the main frame moves is made coincident with the center of rotation of the shaft which drives the gearing. In this instance, in order to diminish the side draft, the outer wheel $A^1$ only drives. An internally-geared spur-wheel, $A^2$, (shown in Fig. 2,) on this wheel drives a corresponding pinion, $d$, on the counter-shaft D, on which the sectors $b$ $b^1$ are pivoted. A bevel-wheel, D′, on this shaft drives a corresponding pinion, $h$, on a secondary shaft, H, crossing the line of the axles of the main wheels, and carrying a spur-wheel, $h'$, driving a corresponding pinion, $i$, on a crank-shaft, I, parallel to the shaft H, and crossing both the main axles and counter-shaft, but at a lower level, to bring the crank closer to the ground.

The cutters are driven by a crank and pitman, in the usual way.

It will be observed that the machine is "triple-geared" instead of "double-geared," and an increased speed is thus given to the cutters without increasing the speed of the horses.

A short finger-beam, J—that is, one no longer than the cutter—is secured to a shoe, K, connected by front and rear arms *k k'* with a beam, L, parallel with the face of the inner wheel. Arms $L^1$ $L^2$, secured to this beam in front and rear, are pivoted to the main frame by joints *l l'*, in line or nearly in line with the crank-shaft, as shown in Fig. 1, by which means the cutting apparatus can play up and down without disturbing the relations of the guards and cutters.

What is claimed herein as the invention of the said PARKHURST is—

1. In a two-wheeled harvester, a frame carrying the cutting apparatus, arranged to vibrate about a center coincident with the center of rotation of a bevel-wheel, mounted on an axis parallel with, but independent of, the main drive-wheel axle, substantially as set forth.

2. The combination, in a two-wheeled harvester, substantially as set forth, of a frame carrying a crank-shaft and pinion, and adjustable around a gear-center in front of the axles of the driving-wheels, with a laterally-projecting cutting apparatus hinged in the line of the crank-shaft.

3. The combination, in a two-wheeled harvester, substantially as set forth, of a frame vibratable about a gear-center independent of the axes of the wheels, with a laterally-projecting cutting apparatus vibrating about a gear-center at right angles to the main axle.

4. The combination, with a two-wheeled harvester, of a laterally-projecting cutting apparatus, connected with the main frame at one end only, and movable around two gear-centers at right angles to each other, and both independent of the driving-wheel axle, substantially as set forth.

5. The combination of the internally-geared driving spur-wheel, the spur-pinion on the counter-shaft, and its bevel-wheel, with the bevel-pinion on the line-shaft, (crossing the axle of the driving-wheels,) and its spur-gear driving the corresponding pinion on the crank-shaft, also crossing the axes of the bearing-wheels, the combination being and operating substantially as set forth.

C. H. McCORMICK.

Witnesses:

T. B. WAKEMAN,

J. B. ROE.